United States Patent [19]
Becker

[11] 3,731,961
[45] May 8, 1973

[54] AUTOMOBILE BUMPER ASSEMBLY

[75] Inventor: Philip D. Becker, Southbury, Conn.

[73] Assignee: Buell Industries, Waterbury, Conn.

[22] Filed: Dec. 16, 1971

[21] Appl. No.: 208,792

[52] U.S. Cl. ............287/189.36 F, 85/44, 151/41.73
[51] Int. Cl. ................................................F16b 7/00
[58] Field of Search............287/189.36 F, 189.36 D, 287/189.36 C, 20.92 R, 20.92 C; 151/41.73; 85/44, 19

[56] References Cited

UNITED STATES PATENTS

| 553,629 | 1/1896 | Stewart et al. ................287/189.36 F |
| 2,019,049 | 10/1935 | Hoke..............................151/41.73 X |
| 2,490,594 | 12/1949 | Madden ............................151/41.73 |
| 3,116,816 | 1/1964 | Johnson ........................287/189.36 F |
| 3,250,051 | 5/1966 | Cheris ......................287/189.36 F X |
| 3,456,972 | 7/1969 | Drotar..........................287/189.36 F |

FOREIGN PATENTS OR APPLICATIONS

| 804,943 | 2/1958 | Great Britain ...............287/189.36 F |
| 399,985 | 7/1933 | Great Britain.....................151/41.73 |

Primary Examiner—David J. Williamowsky
Assistant Examiner—Wayne L. Shedd
Attorney—Robert E. Ross

[57] ABSTRACT

An automobile bumper assembly in which the bumper and support bracket are provided with elongated crossed recesses and a bolt having a ribbed shoulder is assembled into the central opening formed by the crossed recesses so that corresponding indentations are formed in the side edges of each recess to enable the assembly to resist movement of the bumper on the support in impact with an object.

4 Claims, 4 Drawing Figures

PATENTED MAY 8 1973 3,731,961
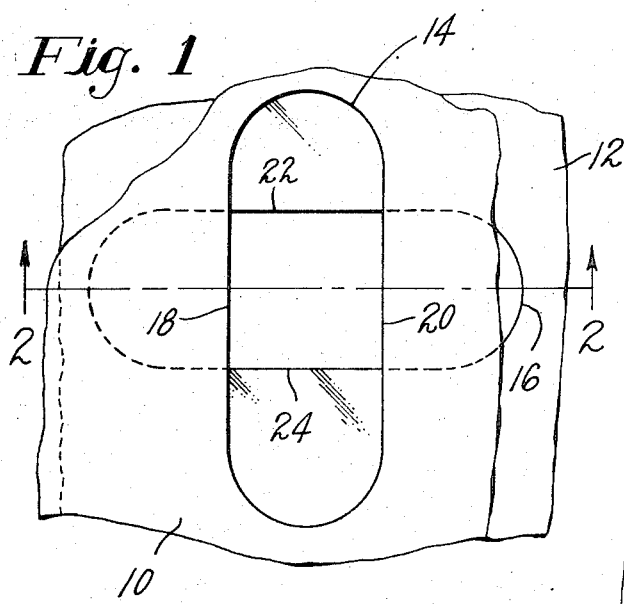
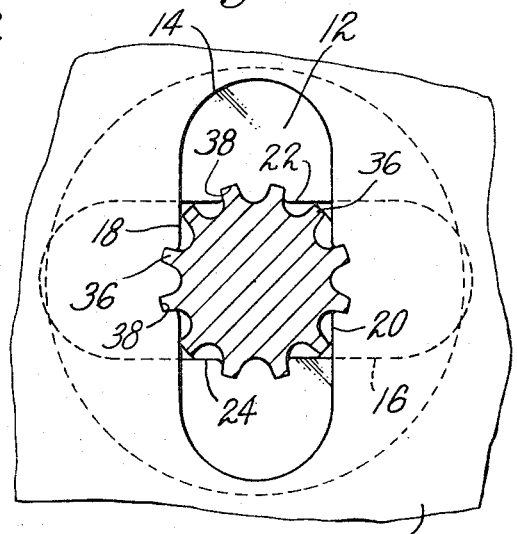
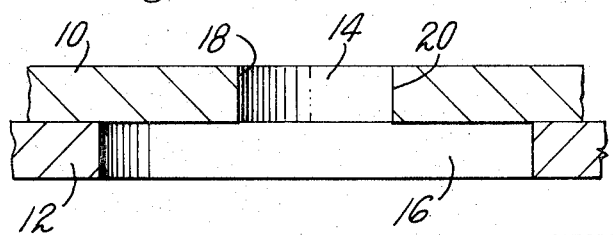
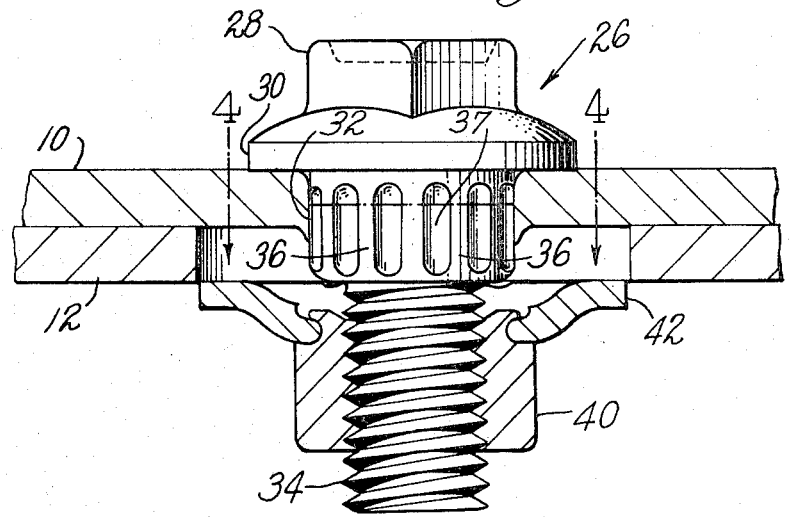

AUTOMOBILE BUMPER ASSEMBLY

BACKGROUND OF THE INVENTION

In the construction of automobiles, the front bumper assembly, which may comprise the bumper itself and a support arm, is customarily bolted onto support brackets attached to a portion of the frame or chassis at the front end thereof. Due to accumulations of tolerances and inaccuracies that occur, it has been found necessary to provide elongated apertures in both the bumper support arm and the support bracket, to allow horizontal and vertical adjustment of the bumper in relation to the support bracket when the bumper is being assembled. Such adjustment is necessary to allow the bumper to be accurately positioned in relation to the surrounding portions of the automobile, such as grill-work and sheet metal trim.

It has recently been proposed that front bumpers on automobiles should be capable of withstanding a collision with a stationary object at some pre-determined speed without damage to any portion of the vehicle. At present the prescribed speed is 5 miles per hour.

In designing and testing bumper structures and energy absorbing devices for this purpose, it has been found that the impact at 5 miles per hour of an automobile that may weigh in excess of 4,000 pounds, with a stationary object, is sufficient to cause the bumper support arm to shift in relation to the support bracket. Although a properly designed support system can absorb the impact without damage, the movement of the bumper itself can cause considerable damage to sheet metal surrounding the bumper.

Summary of the Invention

In accordance with this invention, the bumper support arm and the support bracket are each provided with elongated mounting slots which each have a width less than the overall diameter of a ribbed shoulder of a bolt to be assembled therewith. The plurality of axially extending ribs on the bolt shoulder, on assembly into the square aperture formed by the crossed slots in the overlying bumper and bracket, swage a group of indentations in the opposite sides of each slot. Once the bumper is adjusted to the proper position and the bolt assembled, motion of either member relative to the other is prevented even under stress of an impact with a solid object, within the design limits of the energy absorbing system associated therewith.

FIG. 1 is a top plan view of a superimposed bumper support arm and support bracket in position for receiving a bolt of the type described herein;

FIG. 2 is a view in section taken in line 2—2 of FIG. 1.

FIG. 3 is a view similar to FIG. 2, with the bolt assembled therewith.

FIG. 4 is a view in section taken on line 4—4 of FIG. 3.

Referring to the drawing, there is illustrated a portion of bumper support arm 10 and a support bracket 12, having elongated apertures 14 and 16 respectively, oriented to be disposed generally at a right angle to each other after assembly. The apertures are of sufficient length that any necessary adjustment in position of the bumper in relation to the support may be made, while still maintaining a square central aperture, formed by the opposite sides 18 and 20 of the bumper support arm aperture and the sides 22 and 24 of the support bracket aperture.

The bolt 26 to be assembled into the central square aperture comprises generally a head 28 having a flanged portion 30 with a diameter great enough to provide adequate bearing surface on opposite sides of the bumper support arm aperture, a shoulder 32 disposed beneath the head and having a length substantially equal to combined thickness of the bumper support arm and support bracket, and a threaded shank 34 extending from the shoulder.

The shoulder 32 is provided with a plurality of ribs 36 which extend substantially the full length of the shoulder, forming grooves 37 therebetween. The forward ends of the ribs are rounded inwardly to facilitate entry of the shoulder into the central square aperture.

The shoulder 32 is so dimensioned in relation to the apertures 14 and 18 that the diameter of a circle drawn through the bottom of the grooves 37 is slightly greater than the width of the aperture.

Hence when the shoulder is forced through the apertures, the medial portion of each edge of metal forming the central aperture is deformed outwardly and drawn downwardly as the ribs 36 form corresponding recesses 38 therein. The shoulder therefore enlarges the central aperture and forms the medial portion of the bounding metal edges into a shape which conforms generally to the shape of the adjacent portions of the shoulder and which grips the shoulder tightly.

Transverse movement of the members in relation to each other is thereby impossible without further deformation of the metal of the aperture edges in engagement with the ribs 36.

In the illustrated embodiment the shoulder is provided with 12 ribs, however the exact number is not critical, it being desirable, however, that there be sufficient ribs to insure that regardless of the orientation of the bolt in relation to the central aperture, at least two ribs will be positioned to form recesses in the adjacent metal of the bumper or bracket.

The nut 38 to be assembled onto the bolt is provided with a dished flange 40 for spanning the aperture 16. In the preferred embodiment the flange 40 is rotatably assembled onto the nut to reduce the frictional forces during assembly.

One of the advantages of the disclosed device is that in spite of the large amount of deformation of the edges of the aperture that must occur to admit the shank, the bolt may be assembled by tightening the nut onto the bolt. Driving of the bolt into place by impact, which would be difficult or unacceptable for most automotive assembly applications, is not necessary.

The ease of installation without excessive wrenching torque results from several factors in the design of the assembly. First, by the use of crossed elongated apertures, the bolt is required to deform the edges of only one aperture at a time. That is, in the illustrated embodiment, by the time the ends of the ribs engage the side edges of the support bracket, they have already accomplished most of the deformation necessary to enable the shank to pass through the bumper support arm aperture.

Second, the portions of the side edges that must be deformed downwardly are not disposed over any other metal that would interfere with such movement. That is, the side edges of the bumper support arm that are deformed downwardly are disposed above the aperture 16 in the support bracket, and the side edges of the support bracket that must move downwardly is free to move into the cavity of the dished washer.

Third, the provision of the rotatable washer avoids the high frictional forces that would otherwise develop between the outermost edge of the washer and the surface of the support arm.

Although in the illustrated embodiment the apertures 14 and 16 are disposed at a right angle, it will be apparent that they may be disposed at other angles in relation to each other, in which case the central aperture will be in the form of a parallelogram with equal sides, rather than a square, and the engagement of the ribs with the side edges of the apertures will be displaced from the mid-point of the side edges of the central opening toward the obtuse angles thereof.

Since other changes apparent to those skilled in the art may be made in the device without departing from the scope of the invention, it is intended that all matter contained herein be interpreted in an illustrative and not a limiting sense.

I claim:

1. A bumper assembly, comprising a bumper having a support arm with an aperture having a greater length than width and a mounting bracket having an aperture having a greater length than width, said apertures originally having straight sides and being so oriented that they overlap and cross each other, when the bumper is assembled, and a bolt assembled into the central opening formed by the crossed apertures, said bolt having a head spanning the adjacent aperture and a shoulder disposed below the head extending through both apertures, said shoulder having longitudinal ribs and being forced through the apertures said apertures and said ribs being so dimensional that the ribs impress a plurality of grooves in each of said side walls, whereby transverse movement of said support arm and said mounting bracket is prevented.

2. A bumper assembly as set out in claim 1 in which the circumference of a circle drawn through the bottom of solid grooves is greater than the width of said elongated apertures, and the side walls of said apertures are deformed outwardly by the entry of the bolt shoulder into said apertures, whereby said bolt shoulder is gripped tightly by both said support arm and said bracket.

3. A bumper assembly, comprising a mounting bracket and a bumper support arm, a pair of crossed apertures in said bracket and arm, said apertures each having a greater length than width and a bolt disposed in the central opening formed by said crossed apertures, said bolt having a shoulder portion with a series of radial projections disposed thereon, said shank having an overall diameter around the projections greater than the width of said slots, said bolt being forced through said central opening so that some of said projections form corresponding indentations in the side edges of one elongated aperture and others of said projections form corresponding indentations in the side edges of the other elongated aperture, whereby relative transverse movement of said bracket and said support arm is prevented.

4. A bumper assembly as set out in claim 3 in which the minor diameter of said shoulder portion from which the projections extend is greater than the original width of the elongated apertures, and the side edges of each of the apertures is deformed outwardly by the insertion of said shoulder portion of the bolt therethrough, whereby the side edges of both apertures grip the shoulder of the bolt tightly.

* * * * *